US012810454B2

(12) United States Patent
Wang

(10) Patent No.: US 12,810,454 B2
(45) Date of Patent: Nov. 24, 2026

(54) METHOD AND SYSTEM FOR CO-LOCATING SIMULTANEOUS LOCALIZATION AND MAPPING SYSTEMS

(71) Applicant: HTC Corporation, Taoyuan City (TW)

(72) Inventor: Sui-Hsien Wang, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 210 days.

(21) Appl. No.: 18/779,104

(22) Filed: Jul. 22, 2024

(65) Prior Publication Data

US 2025/0272864 A1 Aug. 28, 2025

(30) Foreign Application Priority Data

Feb. 22, 2024 (TW) ................................ 113106268

(51) Int. Cl.

*G06T 7/579* (2017.01)
*G06V 10/25* (2022.01)
*G06V 10/44* (2022.01)

(52) U.S. Cl.

CPC .............. *G06T 7/579* (2017.01); *G06V 10/25* (2022.01); *G06V 10/44* (2022.01)

(58) Field of Classification Search

CPC ....... G06T 7/579; G06T 7/5579; G06T 7/586; G06T 7/70; G06T 7/97; G06T 19/20; G06T 2207/10; G06T 2207/10028; G06T 2207/30244; G06T 7/80; G06V 10/25; G06V 10/44

See application file for complete search history.

(56) References Cited

U.S. PATENT DOCUMENTS

| | | | | |
|---|---|---|---|---|
| 2009/0213214 A1* | 8/2009 | Yamada | ................ | G06T 7/0012 348/80 |
| 2021/0103763 A1 | 4/2021 | Fan et al. | | |
| 2023/0011950 A1* | 1/2023 | Feng | .................... | G06V 10/247 |

FOREIGN PATENT DOCUMENTS

| | | |
|---|---|---|
| CN | 109945871 | 3/2021 |
| CN | 110726409 | 6/2021 |
| CN | 115516524 | 12/2022 |
| CN | 116295412 | 6/2023 |
| CN | 110349213 | 12/2023 |

OTHER PUBLICATIONS

"Notice of allowance of Taiwan Counterpart Application", issued on Dec. 4, 2024, p. 1-p. 4.

* cited by examiner

*Primary Examiner* — Duy M Dang
(74) *Attorney, Agent, or Firm* — JCIPRNET

(57) ABSTRACT

Disclosed are a method and a system for co-locating simultaneous localization and mapping (SLAM) systems, adaptable for a first SLAM system using an image sensor and a second SLAM system using a depth sensor. The method includes: scanning an anchor in a space by the image sensor to obtain an image of the anchor and capture feature points of the image to create mappoints in the space; scanning the anchor by the depth sensor to obtain shooting directions and depths of sampling points on the anchor; converting the same into coordinates in the space, and downsampling the sampling points to create the fake mappoints based on a position of the depth sensor in the space; and computing a transformation matrix between three dimensional maps of the first and second SLAM systems. The transformation matrix is configured to perform colocation of the first and second SLAM systems.

16 Claims, 7 Drawing Sheets

METHOD AND SYSTEM FOR CO-LOCATING SIMULTANEOUS LOCALIZATION AND MAPPING SYSTEMS

CROSS-REFERENCE TO RELATED APPLICATION

This application claims the priority benefit of Taiwan application serial no. 113106268, filed on Feb. 22, 2024. The entirety of the above-mentioned patent application is hereby incorporated by reference herein and made a part of specification.

Technical Field

The disclosure relates to a method for locating, and in particular to a method and a system for co-locating simultaneous localization and mapping (SLAM) systems.

Description of Related Art

Virtual reality (VR) is a technology that uses computer simulation technology to generate a virtual world in a three dimensional space. This virtual world is composed of computer graphics, which are displayed on a head mounted display (HMD) worn by the user and combined with sensors placed on or around the user. The virtual world can provide an artificial environment that is mainly visual and combines hearing, touch, and other perceptions. The user who experiences VR not only has a visual feeling of being immersed in the virtual world, but can also move around in the virtual world and even interact with objects in the virtual world as if the user were in the real world.

Currently, there are many simultaneous localization and mapping (SLAM) methods that can compute a position of a VR device. The SLAM methods can perform computation based on different sensors, such as a video camera, a light detection and ranging (LiDAR), an acoustic emission (AE) sensor, a radar, etc.

Different SLAM systems need to implement colocation to merge three dimensional maps. When the colocation of two SLAM systems is executed, the best way is to use the same sensors of the two SLAM systems. However, in some cases, the SLAM system needs to use different sensors. For the SLAM systems using different sensors, due to differences in the types and formats of data obtained by the respective sensors, the data storage methods are also different. As such, it is difficult to realize the colocation by comparing the data of the two SLAM systems.

SUMMARY

In view of this, the disclosure provides a method and a system for co-locating simultaneous localization and mapping (SLAM) systems, which can realize colocation among the SLAM systems.

An embodiments of the disclosure provides a method for co-locating simultaneous localization and mapping systems, adaptable for co-locating a first SLAM system using an image sensor and a second SLAM system using a depth sensor. The method includes: scanning an anchor in a space by using the image sensor to obtain an image of the anchor and capturing multiple feature points of the image to create multiple mappoints in the space; scanning the anchor by using the depth sensor to obtain shooting directions and depths of the sampling points on the anchor; converting the shooting directions and the depths of the sampling points into multiple coordinates in the space, and downsampling the sampling points to create multiple fake mappoints based on a position of the depth sensor in the space; and computing a transformation matrix between a three dimensional map of the first SLAM system and a three dimensional map of the second SLAM system based on coordinates of the mappoints and coordinates of the fake mappoints, where the transformation matrix is configured to perform a colocation of the first SLAM system and the second SLAM system.

In some embodiments, the aforementioned steps of converting the shooting directions and the depths of the sampling points into the coordinates in the space based on the position of the depth sensor in the space include: establishing a coordinate system based on the depth sensor to describe positions of the sampling points based on the shooting directions and the depths of the sampling points; and converting the positions of the sampling points into the coordinates in the space based on the position of the depth sensor relative to the space.

In some embodiments, the aforementioned steps of capturing the feature points of the image to create the mappoints in the space include: computing an included angle between each of the feature points and multiple connecting lines of adjacent feature points, and determining whether the included angle is less than a preset angle; retaining the feature point as the mappoint if the included angle is less than the preset angle; and filtering out the feature point if the included angle is not less than the preset angle.

In some embodiments, the aforementioned steps of computing the included angle between each of the feature points and the connecting lines of the adjacent feature points, and determining whether the included angle is less than the preset angle further include: computing a number of the connecting lines whose included angle is less than the preset angle, and multiplying the included angle of the connecting lines by a weight less than one to determine whether to retain the feature point when the number of the connecting lines exceeds a preset number.

In some embodiments, after the aforementioned steps of downsampling the sampling points to create the fake mappoints are performed, the method further includes: computing a ratio of a number of the fake mappoints to a number of the mappoints, and determining whether the ratio is within a preset range; adjusting a preset angle configured to downsample the sampling points, and re-downsampling if the ratio is not within the preset range; and using the downsampled sampling points as the fake mappoints if the ratio is within the preset range.

In some embodiments, the aforementioned step of computing the transformation matrix between the three dimensional map of the first SLAM system and the three dimensional map of the second SLAM system includes: estimating the transformation matrix between the three dimensional map of the first SLAM system and the three dimensional map of the second SLAM system by using a random sample consensus (RANSAC) algorithm or an iterative closest point (ICP) algorithm.

In some embodiments, the aforementioned step of co-locating the first SLAM system and the second SLAM system includes: applying the computed transformation matrix to the three dimensional map of the first SLAM system or the three dimensional map of the second SLAM system, so that the first SLAM system and the second SLAM system use a common coordinate system.

In some embodiments, after the aforementioned step of co-locating the first SLAM system and the second SLAM system is performed, the method further includes: merging the three dimensional map of the first SLAM system with the three dimensional map of the second SLAM system based on the common coordinate system.

In some embodiments, the step of computing the transformation matrix between the three dimensional map of the first SLAM system and the three dimensional map of the second SLAM system based on the coordinates of the mappoints and the coordinates of the fake mappoints includes: synchronizing timestamps of the coordinates of the mappoints configured to compute the transformation matrix and the coordinates of the fake mappoints by using an external trigger or a synchronized internal clock.

An embodiments of the disclosure provides a method for co-locating simultaneous localization and mapping systems, adaptable for co-locating a first SLAM system using an image sensor and a second SLAM system using a depth sensor. The method includes following steps: scanning a space by using the image sensor to obtain an image of the space, capturing multiple feature points of the image to create multiple mappoints in the space, and computing a first bonding box of the mappoints by using a singular value decomposition; scanning the space by using the depth sensor to obtain shooting directions and depths of multiple sampling points in the space; converting the shooting directions and the depths of the sampling points into multiple coordinates in the space, downsampling the sampling points to create multiple fake mappoints, and computing a second bounding box of the fake mappoints by using the singular value decomposition based on a position of the depth sensor in the space; and computing a transformation matrix between a three dimensional map of the first SLAM system and a three dimensional map of the second SLAM system based on the first bounding box, a corresponding first gravity direction, a second bounding box, and a corresponding second gravity direction, where the transformation matrix is configured to perform a colocation of the first SLAM system and the second SLAM system.

In some embodiments, the aforementioned steps of converting the shooting directions and the depths of the sampling points into the coordinates in the space based on the position of the depth sensor in the space include: establishing a coordinate system based on the depth sensor to describe positions of the sampling points based on the shooting directions and the depths of the sampling points; and converting the positions of the sampling points into the coordinates based on the position of the depth sensor relative to the space.

In some embodiments, the aforementioned steps of capturing the feature points of the image to create the mappoints in the space include: computing an included angle between each of the feature points and multiple connecting lines of adjacent feature points, and determining whether the included angle is less than a preset angle; retaining the feature point as the mappoint if the included angle is less than the preset angle; and filtering out the feature point if the included angle is not less than the preset angle.

In some embodiments, the aforementioned steps of computing the included angle between each of the feature points and the connecting lines of the adjacent feature points, and determining whether the included angle is less than the preset angle further include: computing a number of the connecting lines whose included angle is less than the preset angle, and multiplying the included angle of the connecting lines by a weight less than one to determine whether to retain the feature point when the number of the connecting lines exceeds a preset number.

In some embodiments, after the aforementioned step of downsampling the sampling points to create the fake mappoints is performed, the method further includes: computing a ratio of a number of the fake mappoints to a number of the mappoints, and determining whether the ratio is within a preset range; adjusting a preset angle configured to downsample the sampling points, and re-downsampling if the ratio is not within the preset range; and using the downsampled sampling points as the fake mappoints if the ratio is within the preset range.

In some embodiments, the aforementioned steps of computing the transformation matrix between the three dimensional map of the first SLAM system and the three dimensional map of the second SLAM system based on the first bounding box, the corresponding first gravity direction, the second bounding box, and the corresponding second gravity direction include: defining a first floor plane of the first bounding box based on the first gravity direction corresponding to the first bounding box, and defining a second floor plane of the second bounding box based on the second gravity direction corresponding to the second bounding box; and computing the transformation matrix configured to align the first bounding box and the second bounding box based on the first floor plane and the second floor plane.

In some embodiments, the aforementioned step of computing the transformation matrix between the three dimensional map of the first SLAM system and the three dimensional map of the second SLAM system based on the first bounding box, the corresponding first gravity direction, the second bounding box, and the corresponding second gravity direction further includes: estimating an advanced transformation matrix between the three dimensional map of the first SLAM system and the three dimensional map of the second SLAM system by using an iterative closest point algorithm based on coordinates of the mappoints and coordinates of the fake mappoints.

In some embodiments, the aforementioned step of co-locating the first SLAM system and the second SLAM system includes: applying the computed transformation matrix to the three dimensional map of the first SLAM system or the three dimensional map of the second SLAM system, so that the first SLAM system and the second SLAM system use a common coordinate system.

In some embodiments, after the aforementioned step of co-locating the first SLAM system and the second SLAM system is performed, the method further includes: merging the three dimensional map of the first SLAM system with the three dimensional map of the second SLAM system based on the common coordinate system.

An embodiment of the disclosure provides a system for co-locating simultaneous localization and mapping systems. The system includes a first SLAM system having an image sensor, a second SLAM system having a depth sensor, and a processing device. The processing device is coupled to the first SLAM system and the second SLAM system, and is configured to: scan an anchor in a space by using the image sensor to obtain an image of the anchor and capture multiple feature points of the image to create multiple mappoints in the space; scan the anchor by using the depth sensor to obtain shooting directions and depths of multiple sampling points on the anchor; convert the shooting directions and the depths of the sampling points into multiple coordinates, and downsample the sampling points to create multiple fake mappoints based on a position of the depth sensor in the space; and compute a transformation matrix between a three dimensional map of the first SLAM system and a three dimensional map of the second SLAM system based on coordinates of the mappoints and coordinates of the fake mappoints, where the transformation matrix is configure to perform a colocation of the first SLAM system and the second SLAM system.

An embodiment of the disclosure provides a system for co-locating simultaneous localization and mapping systems. The system includes: a first SLAM system having an image sensor, a second SLAM system having a depth sensor, and a processing device. The processing device is coupled to the first SLAM system and the second SLAM system, and is configured to: scan a space by using the image sensor to obtain an image of the space, capture multiple feature points of the image to create multiple mappoints in the space, and compute a first bounding box of the mappoints by using a singular value decomposition; scan the space by using the depth sensor to obtain shooting directions and depths of multiple sampling points in the space; convert the shooting directions and the depths of the sampling points into multiple coordinates in the space, downsample the sampling points to create the mappoints, and compute a second bounding box of the fake mappoints by using the singular value decomposition based on a position of the depth sensor in the space; and compute a transformation matrix between a three dimensional map of the first SLAM system and a three dimensional map of the second SLAM system based on the first bounding box, a corresponding first gravity direction, the second bounding box, and a corresponding second gravity direction, where the transformation matrix is configure to perform a colocation of the first SLAM system and the second SLAM system.

Based on the above, the method and the system for co-locating simultaneous localization and mapping systems of the embodiments of the disclosure obtain multiple three dimensional (3D) points in the space by scanning the same anchor object in the space or directly scanning the same space. After the 3D points are converted into comparable data formats, the transformation matrix is computed by using the algorithms such as the ICP, so the colocation among the SLAM systems can be realized.

In order to make the aforementioned features and advantages of the disclosure more obvious and comprehensible, embodiments are given below and described in detail with reference to the accompanying drawings.

DESCRIPTION OF THE EMBODIMENTS

Simultaneous localization and mapping (SLAM) is a technology that combines information from multiple sensors to compute its own position while building an environment map. Applications of SLAM mainly include robot, virtual reality, and augmented reality. The use of SLAM includes the locating of the sensor itself, as well as subsequent path planning, scene understanding, etc. SLAM systems may be divided into two categories: a visual SLAM and a depth SLAM according to sensor types. The embodiment of the disclosure scans the same anchor object in the space or directly scans the same space by these two SLAM systems to obtain feature points and coordinates. After the feature points and coordinates are converted into comparable data formats, a transformation matrix is computed by using algorithms such as an iterative closest point (ICP). Thus, a common coordinate system derived from above is configured to merge/fuse an environmental map built by the two SLAM systems.

Figure 1:
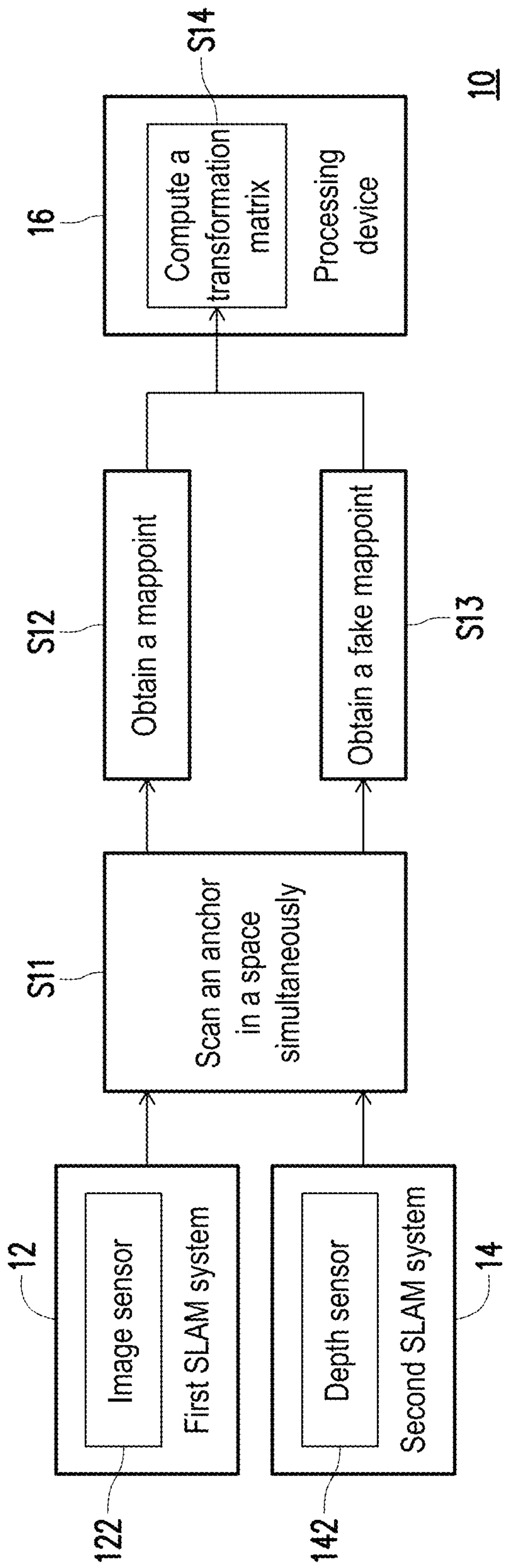
FIG. 1 is a schematic diagram of operation of a system for co-locating simultaneous localization and mapping systems according to an embodiment of the disclosure.

FIG. 1 is a schematic diagram of operation of a system for co-locating simultaneous localization and mapping systems according to an embodiment of the disclosure. Referring to FIG. 1, a colocation system 10 of this embodiment includes a first SLAM system 12 having an image sensor 122, a second SLAM system 14 having a depth sensor 142, and a processing device 16.

The first SLAM system 12 is, for example, a visual SLAM system. The first SLAM system 12 scans an anchor in the space by the image sensor 122 to obtain an image of the anchor and captures multiple feature points of the image to create multiple mappoints in the space. The image sensor 122 includes, for example, a charge coupled device (CCD), a complementary metal-oxide semiconductor (CMOS) device or other types of photosensitive devices, and may sense light intensity to generate an image of a photographic scene. The first SLAM system 12, for example, estimates positions and depths of the feature points of the image by two or multiple frames of images, thereby creating the mappoints in the space, but this embodiment is not limited thereto. In other embodiments, the image sensor 122 may also be an infrared sensor and is configured to capture an infrared image. In addition, a method for capturing the feature points includes using algorithms such as an oriented fast and rotated brief (ORB), a scale-invariant feature transform (SIFT) or speeded up robust features (SURF) to capture key points or landmarks of the image, but this embodiment is not limited thereto.

The second SLAM system 14 is, for example, a depth SLAM system. The second SLAM system 14 scans the anchor in the space by the depth sensor 142 to obtain shooting directions and depths of multiple sampling points on the anchor. The depth sensor 142 is, for example, a two dimensional (2D) or a three dimensional (3D) light detection and ranging (LiDAR), a monocular camera, a stereoscopic camera, a time of flight (ToF) camera, a radar, or an ultrasonic radar, where the monocular camera and the stereoscopic camera measure distance by adopting a binocular vision technology, and other sensors measure distance by adopting a ToF technology. When recording the depth image, the second SLAM system 14 usually stores the position at the time of shooting and multiple sets of the shooting directions and the depths.

The processing device 16 includes, for example, a central processing unit (CPU), a programmable microprocessor for a common purpose or a specific purpose, a microcontroller, a digital signal processor (DSP), a programmable controller, an application specific integrated circuits (ASIC), a programmable logic device (PLD), other similar devices, or a combinations thereof, and the disclosure is not limited thereto. In this embodiment, the processing device 16 may load a computer program to execute the method for co-locating the SLAM system according to the embodiment of the disclosure.

In some embodiments, the processing device 16 may be integrated into the first SLAM system 12 or the second SLAM system 14 and may be configured to compute the transformation matrix between a three dimensional map (3D map) of the first SLAM system 12 and a three dimensional map of the second SLAM system 14. The transformation matrix may be configured to perform a colocation of the first SLAM system 12 and the second SLAM system 14. That is, the first SLAM system 12 or the second SLAM system 14 may transmit the 3D map obtained by itself as well as its own position and attitude to the other party. The other party may compute the transformation matrix, and the transformation matrix is configured to perform the colocation. The 3D map is, for example, a point cloud map or a map composed of mappoints or depth points, and there is no limitation here.

For example, in Step S11, the colocation system 10 of this embodiment, the image sensor 122 of the first SLAM system 12 and the depth sensor 142 of the second SLAM system 14 simultaneously scan the anchor in the space. In Step S12, the first SLAM system 12 obtains the mappoints, and the mappoints are sent to the processing device 16. In Step S13, the second SLAM system 14 obtains fake mappoints, and the fake mappoints are sent to the processing device 16. The processing device 16 may compute the transformation matrix between the 3D map of the first SLAM system 12 and the 3D map of the second SLAM system 14 based on the mappoints obtained from the first SLAM system 12 and the fake mappoints obtained from the second SLAM system 14, and the transformation matrix is configured to perform the colocation of the first SLAM system 12 and the second SLAM system 14.

Figure 2:
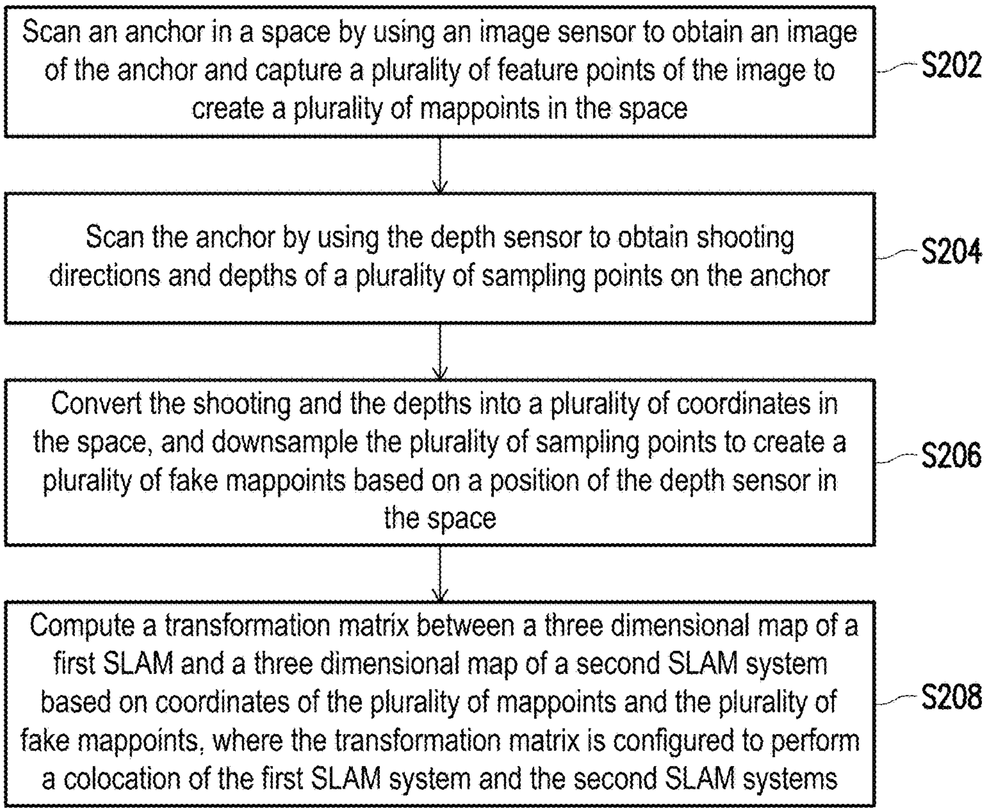
FIG. 2 is a flow chart of a method for co-locating simultaneous localization and mapping systems according to an embodiment of the disclosure.

Specifically, FIG. 2 is a flow chart of a method for co-locating simultaneous localization and mapping systems according to an embodiment of the disclosure. Referring to FIG. 1 and FIG. 2 at the same time, the method for co-locating of this embodiment is applicable to the colocation system 10 in FIG. 1.

In Step S202, the first SLAM system 12 scans the anchor in the space by using the image sensor 122 to obtain the image of the anchor and captures the feature points of the image to create the mappoints in the space. In some embodiments, the first SLAM system 12 photographs multiple images of the anchor by using the image sensor 122 during movement and estimates the depth of each feature point in the space according to changes in its own position and attitude and changes in the location of the feature points of the image, thereby creating the mappoints in the space.

In Step S204, the second SLAM system 14 scans the anchor by using the depth sensor 142 to obtain the shooting directions and the depths of the sampling points on the anchor. When scanning the anchor to record the depth image, the second SLAM 14 obtains, for example, the position of the depth sensor 142 at the time of shooting and the sets of the shooting directions and the depths obtained by the depth sensor 142.

Figure 3:
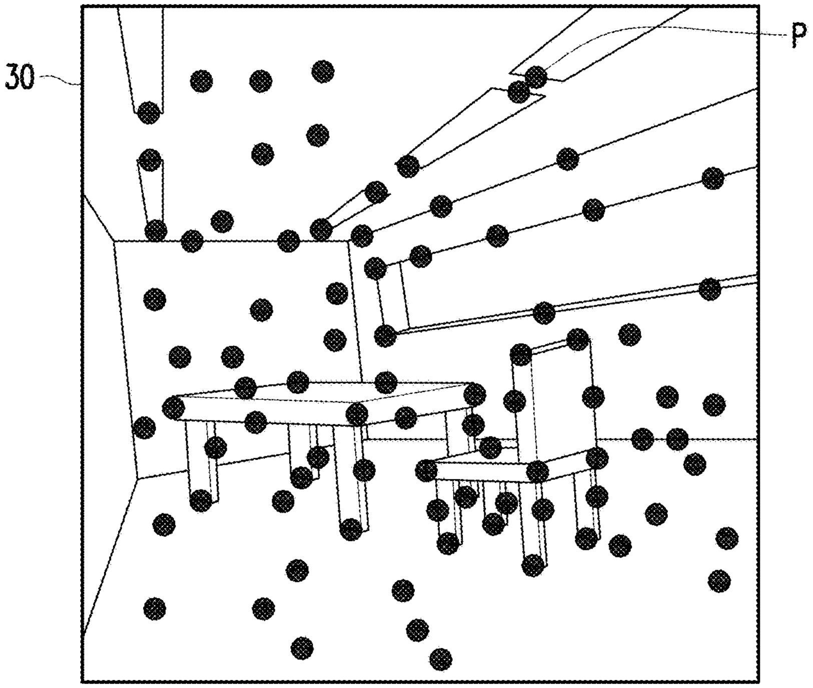
FIG. 3 is a schematic diagram of a mappoint according to an embodiment of the disclosure.

Specifically, the visual SLAM mainly uses the mappoints while the depth SLAM mainly uses the point clouds and the depth points. These points may represent three dimensional (3D) points in space. Taking FIG. 3 as an example, multiple points P of an image 30 are mappoints. Each mappoint may be regarded as a 3D point (x, y, z) with additional information (such as the image presented by the 3D point). As far as the point clouds are concerned, each point is also a 3D point. The difference between the point clouds and the mappoints lies in that the points of point clouds do not carry additional information, but this is for general depth SLAM. If a red, green, and blue depth (RGB-D) SLAM is used, the color information may be carried. In addition, the point clouds are denser than the mappoints.

In Step S206, the second SLAM system 14 converts the shooting directions and the depths of the sampling points into multiple coordinates in the space based on the position of the depth sensor 142 in the space, and downsamples the sampling points to create the fake mappoints.

Specifically, each depth point is based on a set of depths observed at a set of positions and directions, so when the depth points are converted into the sampling points in the space, a coordinate based on the depth sensor 142 is established to describe the positions of the sampling points based on the shooting directions of the sampling points and depths, and then the positions of the sampling points are converted into the coordinates in the space based on the position of the depth sensor 142 relative to the space.

Figure 4A:
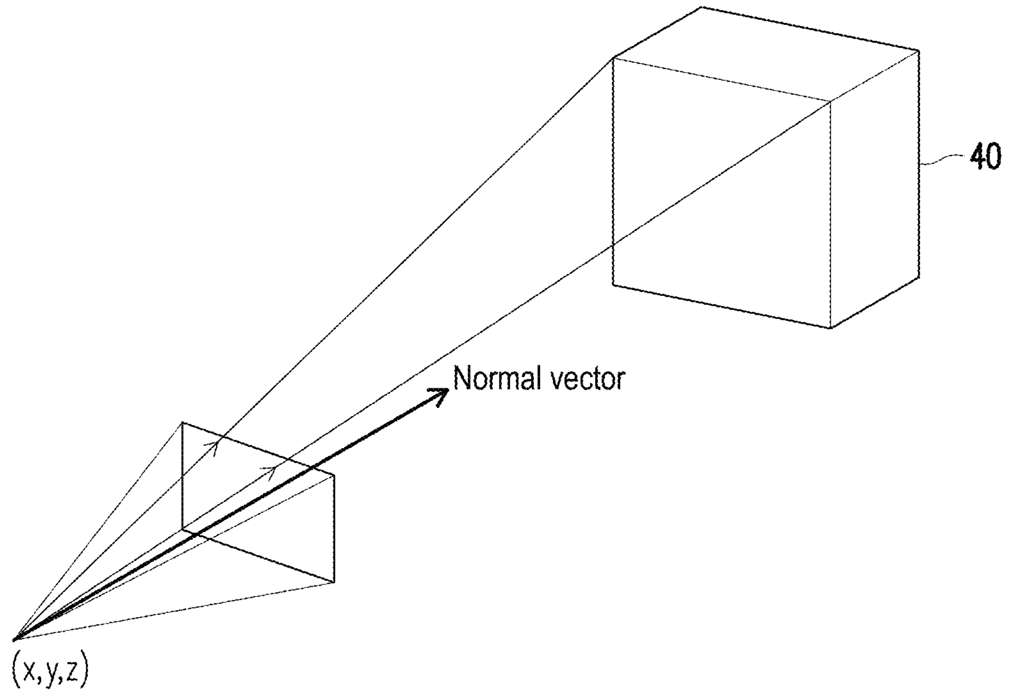
FIG. 4A to FIG. 4C are schematic diagrams of depth point conversions according to an embodiment of the disclosure.
Figure 4B:
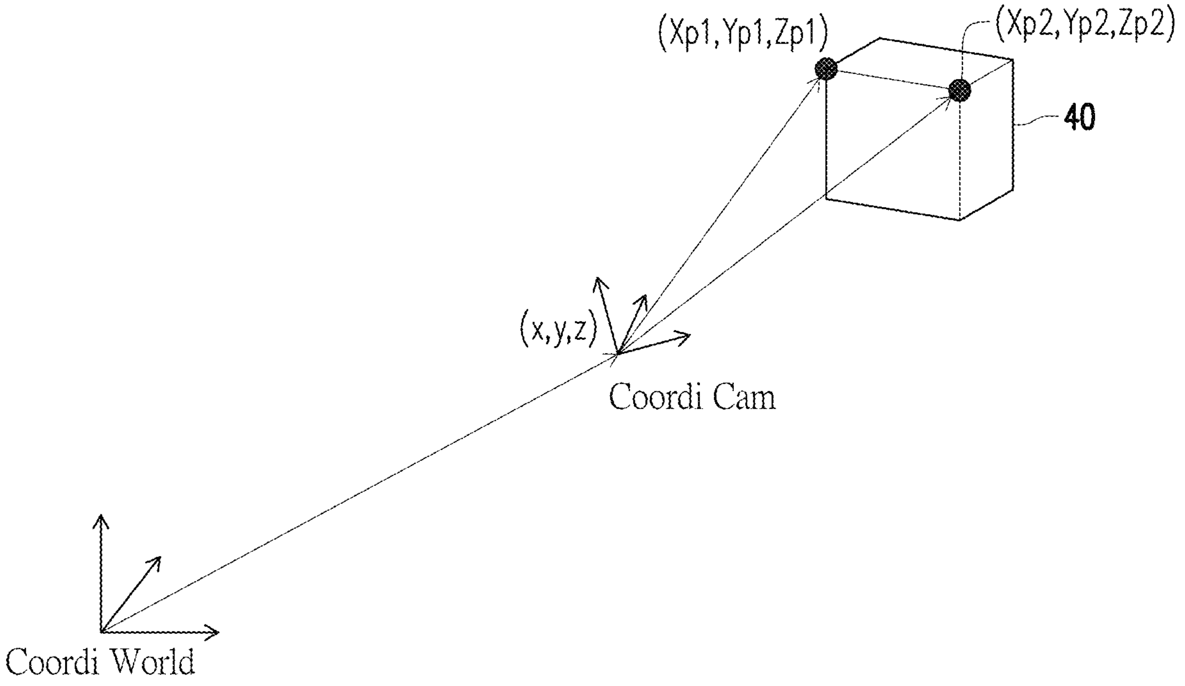
Figure 4C:
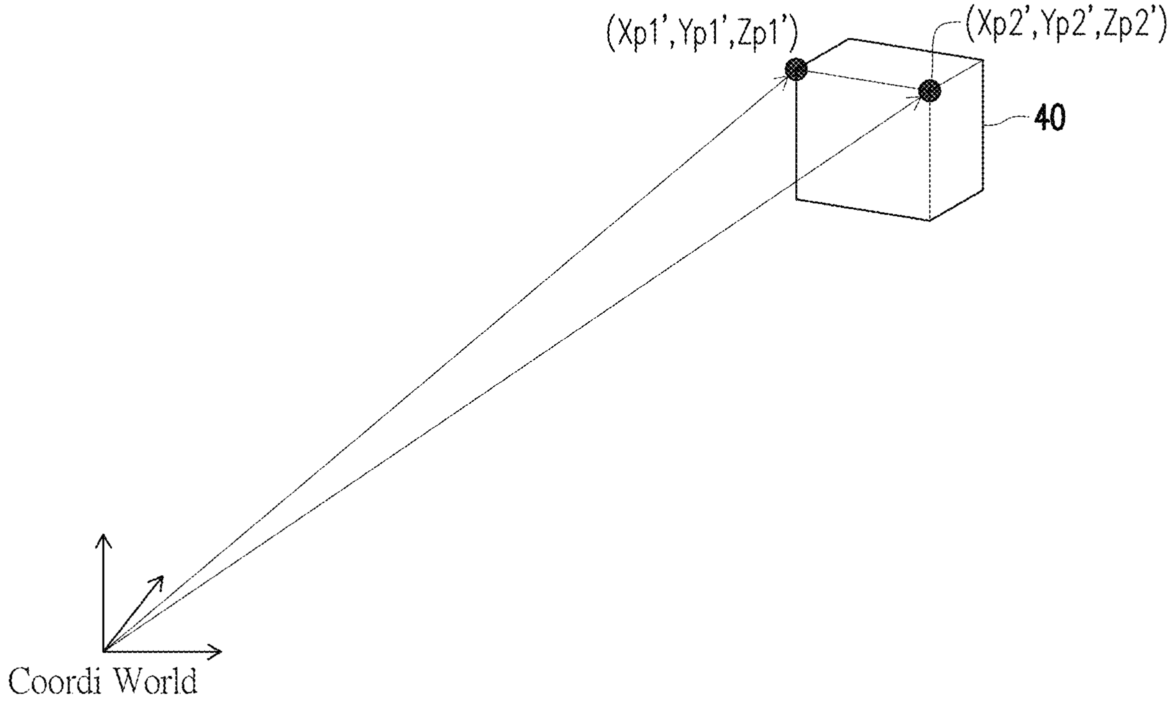

For example, FIG. 4A to FIG. 4C are schematic diagrams of depth point conversions according to an embodiment of the disclosure. Referring to FIG. 4A, the depth SLAM system may obtain the shooting directions and the depths of the sampling points on the anchor 40 by scanning the anchor 40 in the space. Next, referring to FIG. 4B, the depth SLAM system may establish a coordinate system Coordi Cam to describe the positions of these sampling points based on the position (x, y, z) of the depth sensor, for example, (Xp1, Yp1, Zp1) and (Xp2, Yp2, Zp2). Afterwards, referring to FIG. 4C, by the position and the direction of the depth sensor relative to the space coordinates, the sampling points may be converted back to the coordinates under the world space coordinate system Coordi world based on the coordinate system Coordi Cam, for example, (Xp1', Yp1', Zp1') and (Xp2', Yp2', Zp2').

It should be noted that direct computation of the transformation matrix may easily cause computation errors due to the large gap between the density of the point clouds and the mappoints. Therefore, it is necessary to adjust the number of points on both sides to make the point clouds and the mappoints as close as possible, and then perform the computation of the transformation matrix.

The visual SLAM only uses images, so when creating map points, the visual SLAM tends to build the mappoints in the corners. Accordingly, when creating the mappoints, this embodiment may try to retain the 3D points in the corners and delete the rest points.

In some embodiments, the method for finding corners may be to connect the adjacent 3D points and compare the included angles between the connecting lines. If the included angle is less than a preset angle θ, then the position may be determined to be a corner. Specifically, the first SLAM system 12, for example, computes the included angles between each feature point and multiple connecting lines of the adjacent feature points, and determines whether the included angle is less than a preset angle. If the included angle is less than the preset angle, the feature point may be retained as a fake mappoint; otherwise, if the included angle is not less than the preset angle, the feature point may be filtered out.

In some embodiments, in the situation that the same point is connected to multiple adjacent 3D points, if the included angle of the connecting lines is less than the preset angle θ, then the computed angle may be multiplied by a preset weight (for example, 0.8) to enhance the possibility that a corner point may not be filtered out. Specifically, the first SLAM system 12 may, for example, compute the number of the connecting lines whose included angle is less than the preset angle, and multiply the included angle of the connecting lines by a weight less than one to determine whether to retain the feature point when the number exceeds the preset number.

Figure 5:
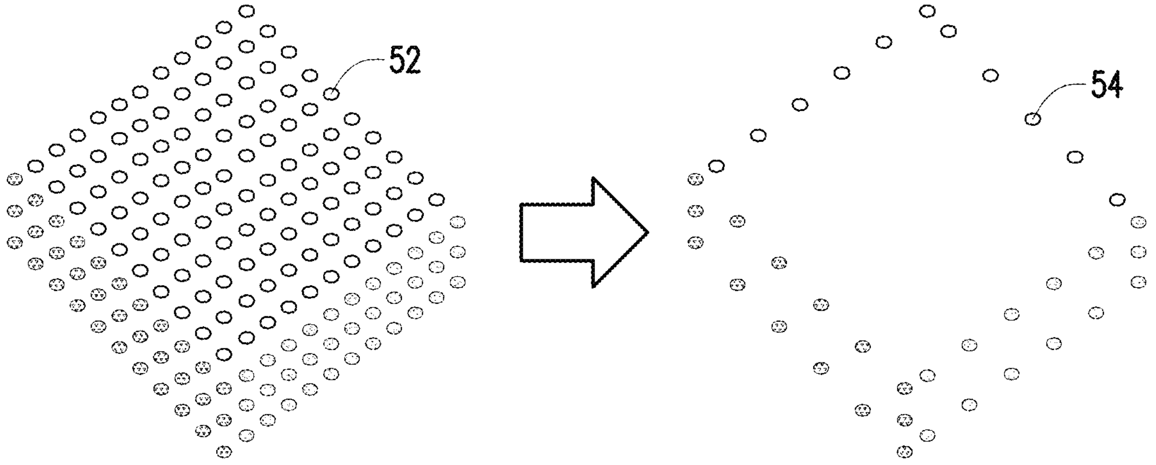
FIG. 5 is a schematic diagram of downsampling according to an embodiment of the disclosure.

In some embodiments, the distance on the edge before sampling a 3D point may be set to avoid the problem of retaining too many 3D points on the same edge. For example, as shown in FIG. 5, for multiple 3D points 52 of the image, one 3D point may be sampled at a fixed distance on each edge, thereby obtaining a downsampled 3D point 54 as a mappoint.

In some embodiments, in order to make the number of the mappoints and the number of the downsampled sampling points as close as possible, the numbers of the two may be further compared. The number of the downsampled sampling points is divided by the number of the mappoints, and the divided number is checked whether to fall within the range of plus or minus 15% (that is, 85%~115%). If the divided number exceeds the range, the preset angle θ may be adjusted again and re-downsampled. The aforementioned range is for illustration only, but is not limited thereto.

Specifically, the second SLAM system 14 may, for example, compute the ratio of the number of the fake mappoints to the number of the mappoints, and determine whether the ratio is within the preset range. If the ratio is not within the preset range, then the preset angle configured to downsample the sampling points is adjusted, and re-downsampled. If the ratio is within the preset range, then the downsampled sampling points are used as the fake mappoints.

Figure 6:
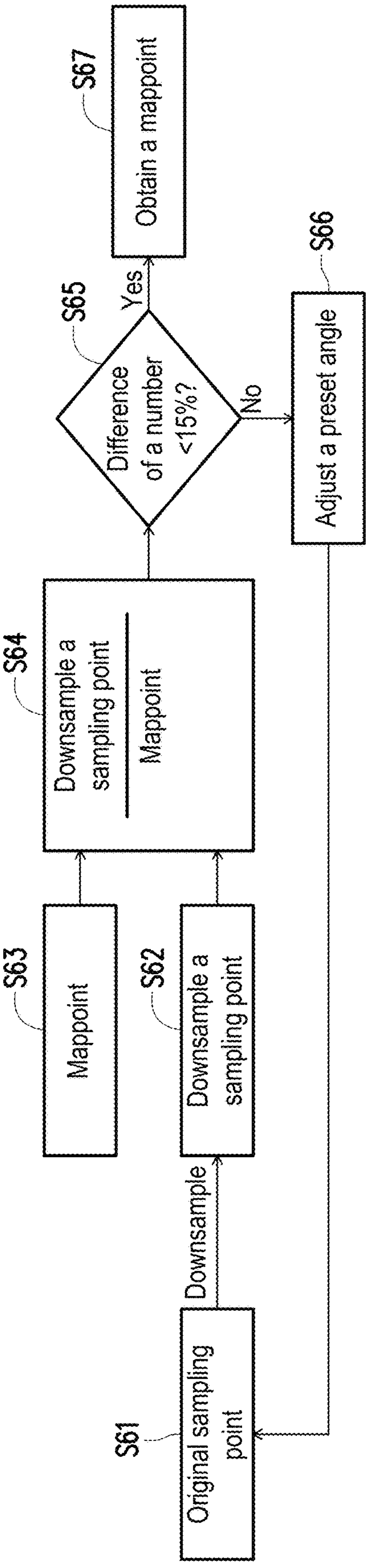
FIG. 6 is a flow chart of a method for downsampling a sampling point according to an embodiment of the disclosure.

For example, FIG. 6 is a flow chart of a method for downsampling a sampling point according to an embodiment of the disclosure. Referring to FIG. 6, this embodiment illustrates a process of downsampling implemented by the second SLAM system 14 in FIG. 1.

In Step S61, the second SLAM system 14 scans the anchor by using the depth sensor 142 to obtain the shooting directions and the depths of the sampling points on the anchor, and after the second SLAM system 14 converts the shooting directions and the depths of these sampling points into the coordinates in the space, these sampling points are used as the original sampling points.

In Step S62, the second SLAM system 14 implements the downsampling on these sampling points to obtain the downsampled sampling points.

In Step S63, the second SLAM system 14 obtains the mappoints created by itself from the first SLAM system 12.

In Step S64, the second SLAM system 14 computes the ratio of the downsampled sampling points to the mappoints.

In Step S65, the second SLAM system 14 checks whether the difference between the number of the downsampled sampling points and the number of the mappoints is less than 15% by the computed ratio.

If the number is determined to be not less than 15%, then the second SLAM system 14 adjusts the preset angle in Step S66 and returns to Step S61 to re-downsample on the original sampling points. On the contrary, if the number is determined to be less than 15%, then the second SLAM system 14 creates the fake mappoints by the downsampled sampling points in Step S67. In some embodiments, if the computed ratio is greater than 115%, the preset angle may be reduced. On the contrary, if the computed ratio is less than 85%, the preset angle may be increased.

Returning to the process of FIG. 2, the processing device 16 computes the transformation matrix between the 3D map of the first SLAM system 12 and the 3D map of the second SLAM system 14 based on the coordinates of the mappoints and the fake mappoints in Step S208, and the transformation matrix is configured to perform colocation of the first SLAM system 12 and the second SLAM system 14.

Specifically, the processing device 16 estimates the transformation matrix between the 3D map of the first SLAM system 12 and the 3D map of the second SLAM system 14 by using, for example, a random sample consensus (RANSAC) algorithm or an iterative closest point (ICP) algorithm. In some embodiments, the processing device 16 may synchronize the timestamps of the coordinates of the mappoints configured to compute the transformation matrix and the coordinates of the fake mappoints by using an external trigger or a synchronized internal clock, so that the mappoints and the fake mappoints configured to compute the transformation matrix correspond to each other.

In addition, the processing device 16 further applies the computed transformation matrix to the 3D map of the first SLAM system 12 or the 3D map of the second SLAM system 14, so that the first SLAM system 12 and the second SLAM system 14 use a common coordinate system. In some embodiments, the processing device 16 may merge the 3D map of the first SLAM system 12 with the 3D map of the second SLAM system 14 based on this common coordinate system.

By the aforementioned method, the colocation system 10 of this embodiment may integrate the 3D maps of the SLAM systems using different sensing methods to realize the cooperation of multiple SLAM systems, thereby expanding the scope of the 3D map and/or improving the accuracy of the 3D map.

Based on the object in the space that may be regarded as an anchor, the aforementioned embodiment may realize the colocation among the SLAM systems by scanning the anchor. However, when there is no anchor in the space, the disclosure also provides the colocation method corresponding to the SLAM system.

Figure 7:
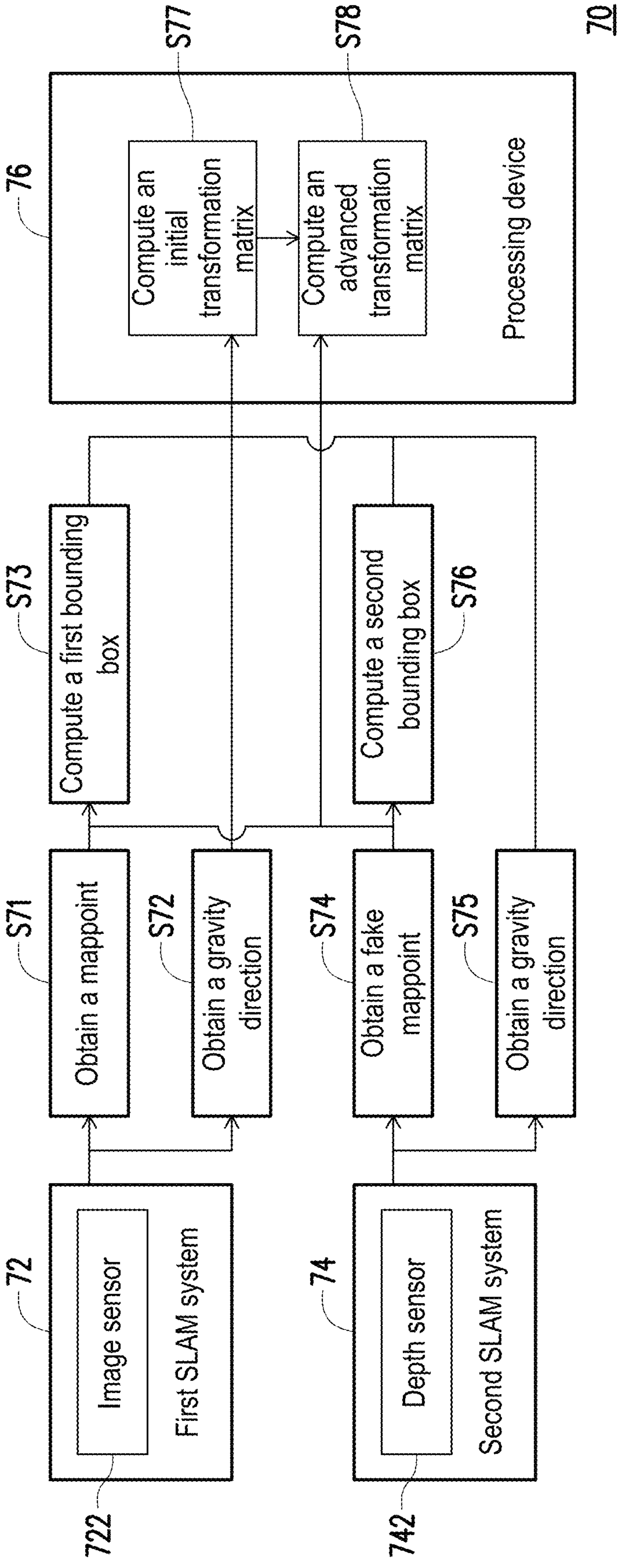
FIG. 7 is a schematic diagram of operation of a system for co-locating simultaneous localization and mapping systems according to an embodiment of the disclosure.

Specifically, FIG. 7 is a schematic diagram of operation of a system for co-locating simultaneous localization and mapping systems according to an embodiment of the disclosure. Referring to FIG. 7, a colocation system 70 of this embodiment includes a first SLAM system 72 having an image sensor 722, a second SLAM system 74 having a depth sensor 742, and a processing device 76. The configurations of the first SLAM system 72, the second SLAM system 74, and the processing device 76 are the same or similar to the first SLAM system 12, the second SLAM system 14, and the processing device 16 in the aforementioned embodiment, so the details are not be repeated here.

Different from the aforementioned embodiment, in Step S71, the colocation system 70 of this embodiment, for example, scans the space by the image sensor 722 of the first SLAM system 72 to obtain the image of the space and capture the feature points of the image to create the mappoints of the space. In Step S72, the first SLAM system 72 obtains the gravity direction when the image sensor 722 scans the space. In Step S73, the first SLAM system 72 further computes a first bounding box of the mappoint by using a singular value decomposition (SVD).

On the other hand, in Step S74, the second SLAM system 74 scans the same space by using the depth sensor 742 to obtain the shooting directions and the depths of the sampling points in the space and obtains the fake mappoionts by the coordinate transformation and the downsampling. In Step S75, the second SLAM system 74 obtains the gravity direction when the depth sensor 742 scans the space. In Step S76, the second SLAM system 74 further computes a second bounding box of the fake mappoints by using the SVD.

In Step S77, the processing device 76 computes an initial transformation matrix between the 3D map of the first SLAM system 72 and the 3D map of the second SLAM system 74 based on the first bounding box, a corresponding gravity direction of the first bounding box, the second bounding box, and a corresponding gravity direction of the second bounding box.

In Step S78, the processing device 76 estimates an advanced transformation matrix between the 3D map of the first SLAM system 72 and the 3D map of the second SLAM system 74 by the ICP algorithm based on the coordinates of multiple map points and the coordinates of the fake mappoints for the initial transformation matrix, thereby performing the colocation of the first SLAM system 72 and the second SLAM system 74 by using this advanced transformation matrix.

Figure 8:
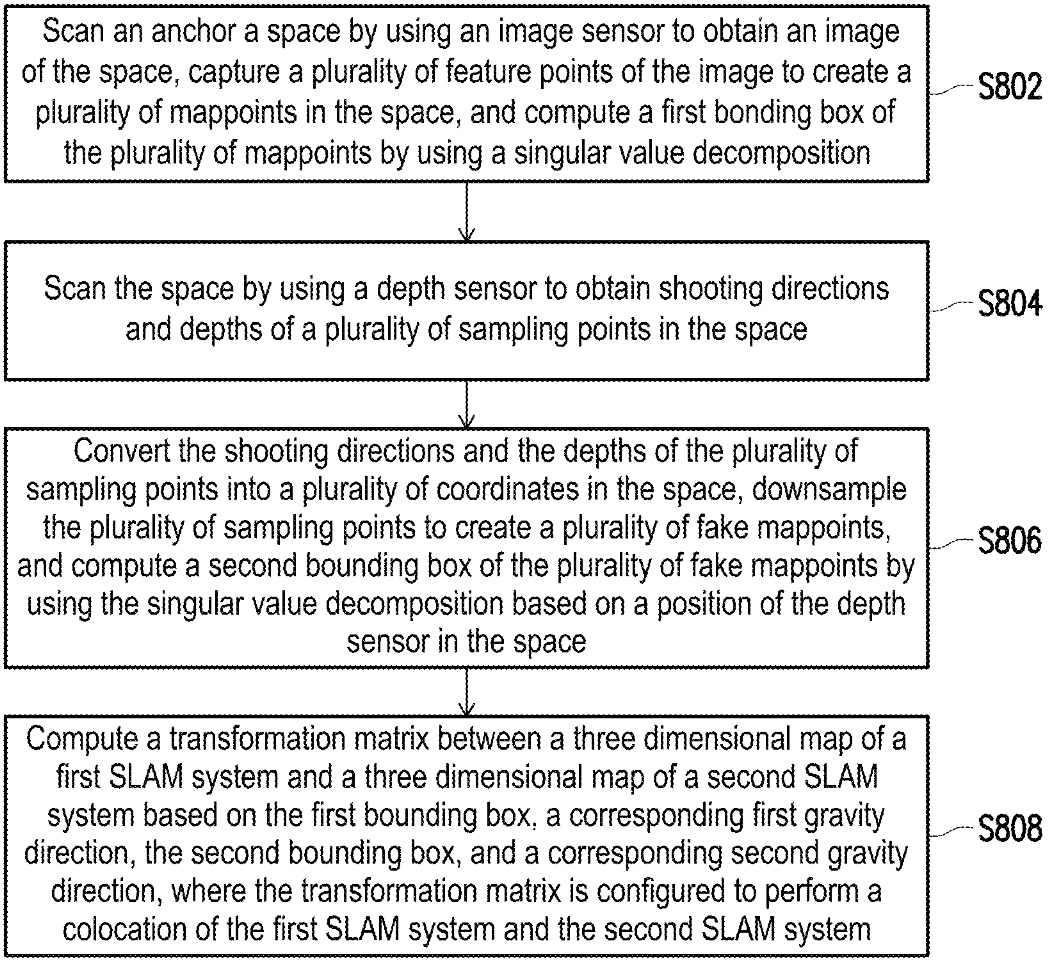
FIG. 8 is a flow chart of a method for co-locating simultaneous localization and mapping systems according to an embodiment of the disclosure.

Specifically, FIG. 8 is a flow chart of a method for co-locating simultaneous localization and mapping systems according to an embodiment of the disclosure. Referring to FIG. 7 and FIG. 8 at the same time, the colocation method of this embodiment is applicable to the colocation system 70 in FIG. 7.

In Step S802, the first SLAM system 72 scans the space by using the image sensor 722 to obtain the image of the space, captures the feature points of the image to create the mappoints in the space, and computes the first bounding box of the mappoints by using the SVD. The space is, for example, an indoor space, which includes multiple planes such as a floor, surrounding walls, and a ceiling. The first boundary box is, for example, composed of one or more of these planes, but this embodiment is not limited thereto.

In some embodiments, the first SLAM system 72, for example, captures the mappoints located on different planes in the space from the image of the space and fits a three dimensional (3D) plane by these mappoints, which includes computing the vectors from each mappoint to multiple adjacent mappoints, and the vectors are configured to compute the normal vector of the plane in which the mappoint is located. By comparing the normal vectors of the mappoints, the first SLAM system 72 may fit the plane in which these mappoints are located based on the mappoints with the same or similar normal vectors.

In some embodiments, when creating the mappoints, the first SLAM system 72 tends to build the mappoints in the corners, for example. The method for finding corners may be connecting lines by the adjacent feature points and comparing the included angels between the connecting lines. The way in which the first SLAM system 72 creates the mappoints is the same or similar to the way in which the first SLAM system 12 creates the mappoints in the aforementioned embodiment, so the details thereof are not repeated here.

On the other hand, in Step S804, the second SLAM system 74 scans the space by using the depth sensor 742 to obtain the shooting directions and the depths of the sampling points in the space. In Step S806, the second SLAM system 74 converts the shooting directions and the depths of the sampling points into the coordinates in the space, downsamples on the sampling points to create the fake mappoints, and computes the second bounding box of these fake mappoints by using the SVD based on the position of the depth sensor 742 in the space.

Specifically, the second SLAM system 74, for example, establishes a coordinate system based on the depth sensor 142 to describe the positions of the multiple sampling points based on the shooting directions and the depths of the sampling points, and then converts the positions of the sampling points into the coordinates in the space based on the position of the depth sensor 142 relative to the space.

In some embodiments, the second SLAM system 74, for example, computes the ratio of the number of the fake mappoints to the number of the mappoints, and determines whether the ratio is within the preset range. If the ratio is not within the preset range, then the preset angle configured to downsample the sampling point is adjusted, and re-downsampled. If the ratio is within the preset range, the downsampled sampling point is used as the fake mappoint.

In addition, similar to the way in which the first SLAM system 72 computes the first bounding box, the second SLAM system 74, for example, fits the 3D plane by the fake mappoint obtained by the downsampling, which includes computing the vectors from each mappoint to the adjacent mappoints, and the vectors are configured to compute the normal vector of the plane in which the mappoint is located. By comparing the normal vectors of the mappoints, the second SLAM system 74 may fit the plane in which these mappoints are located based on the mappoints with the same or similar normal vectors.

In Step S808, the processing device 76 computes the transformation matrix between the 3D map of the first SLAM system 72 and the 3D map of the second SLAM system 74 based on the first bounding box, a corresponding first gravity direction, the second bounding box, and a corresponding second gravity direction, and the transformation matrix is configured to perform the colocation of the first SLAM system 72 and the second SLAM system 74.

Specifically, the processing device 76 defines a first floor plane of the first bounding box based on the first gravity direction corresponding to the first bounding box, defines a second floor plane of the second bounding box based on the second gravity direction corresponding to the second bounding box, and estimates the initial transformation matrix configured to align the first bounding box and the second bounding box based on the aforementioned first floor plane and the second floor plane.

Based on this initial transformation matrix, the processing device 76 may further estimate the advanced transformation matrix between the 3D map of the first SLAM system 72 and the 3D map of the second SLAM system 74 by using the RANSAC algorithm or the ICP algorithm based on the coordinates of the mappoints and the coordinates of the fake mappoints. In some embodiments, the processing device 76 may synchronize the timestamps of the coordinates of the mappoints configured to compute the transformation matrix and the coordinates of the fake mappoints by using the external trigger or the synchronized internal clock, so that the mappoints and the fake mappoints configured to compute the transformation matrix correspond to each other.

By the aforementioned method, the colocation system 70 of this embodiment may integrate the 3D maps of the SLAM systems using different sensing methods to realize the cooperation of the SLAM systems, thereby expanding the scope of the 3D map and/or improving the accuracy of the 3D map.

In summary, the method and the system for co-locating SLAM systems according to the embodiments of the disclosure obtain the feature points and the coordinates of the feature points by using the two SLAM systems to scan the same anchor object or scan the same space directly. After the data is marked and converted into a comparable data format, the transformation matrix is computed by using the algorithms such as the RANSAC or the ICP and is configured to perform the colocation of the SLAM system, thereby merging/amalgamating the environmental maps constructed by the two SLAM systems. Thus, the scope of the 3D map may be expanded and/or the accuracy of the 3D map may be improved.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the appended claims.

What is claimed is:

1. A method for co-locating simultaneous localization and mapping systems, adaptable for co-locating a first simultaneous localization and mapping system using an image sensor and a second simultaneous localization and mapping system using a depth sensor, the method comprising:

scanning an anchor in a space by using the image sensor to obtain an image of the anchor and capturing a plurality of feature points of the image to create a plurality of mappoints in the space;

scanning the anchor by using the depth sensor to obtain shooting directions and depths of a plurality of sampling points on the anchor;

converting the shooting directions and the depths of the plurality of sampling points into a plurality of coordinates in the space, and downsampling the plurality of sampling points to create a plurality of fake mappoints based on a position of the depth sensor in the space;

computing a transformation matrix between a three dimensional map of the first simultaneous localization and mapping system and a three dimensional map of the second simultaneous localization and mapping system based on coordinates of the plurality of mappoints and coordinates of the plurality of fake mappoints;

applying the transformation matrix is configured to the three dimensional map of the first simultaneous localization and mapping system or the three dimensional map of the second simultaneous localization and mapping system to perform a colocation of the first simultaneous localization and mapping system and the second simultaneous localization and mapping system, so that the first simultaneous localization and mapping system and the second simultaneous localization and mapping system use a common coordinate system; and merging the three dimensional map of the first simultaneous localization and mapping system with the three dimensional map of the second simultaneous localization and mapping system based on the common coordinate system.

2. The method according to claim 1, wherein the steps of converting the shooting directions and the depths of the plurality of sampling points into the plurality of coordinates in the space based on the position of the depth sensor in the space comprise:

establishing a coordinate system based on the depth sensor to describe positions of the plurality of sampling points based on the shooting directions and the depths of the plurality of sampling points; and converting the positions of the plurality of sampling points into the plurality of coordinates in the space based on the position of the depth sensor relative to the space.

3. The method according to claim 1, wherein the steps of capturing the plurality of feature points of the image to create the plurality of mappoints in the space comprise:

computing an included angle between each of the plurality of feature points and a plurality of connecting lines of adjacent feature points, and determining whether the included angle is less than a preset angle;

retaining the feature point as the mappoint if the included angle is less than the preset angle; and filtering out the feature point if the included angle is not less than the preset angle.

4. The method according to claim 3, wherein the steps of computing the included angle between each of the plurality of feature points and the plurality of connecting lines of the adjacent feature points, and determining whether the included angle is less than the preset angle further comprise:

computing a number of the plurality of connecting lines whose included angle is less than the preset angle, and multiplying the included angle of the plurality of connecting lines by a weight less than one to determine whether to retain the feature point when the number of the plurality of connecting lines exceeds a preset number.

5. The method according to claim 1, wherein after the steps of downsampling the plurality of sampling points to create the plurality of fake mappoints are performed, the method further comprises:

computing a ratio of a number of the plurality of fake mappoints to a number of the plurality of mappoints, and determining whether the ratio is within a preset range;

adjusting a preset angle configured to downsample the plurality of sampling points, and re-downsampling if the ratio is not within the preset range; and using the plurality of downsampled sampling points as the plurality of fake mappoints if the ratio is within the preset range.

6. The method according to claim 1, wherein the step of computing the transformation matrix between the three dimensional map of the first simultaneous localization and mapping system and the three dimensional map of the second simultaneous localization and mapping system comprises:

estimating the transformation matrix between the three dimensional map of the first simultaneous localization and mapping system and the three dimensional map of the second simultaneous localization and mapping system by using a random sample consensus algorithm or an iterative closest point algorithm.

7. The method according to claim 1, wherein the step of computing the transformation matrix between the three dimensional map of the first simultaneous localization and mapping system and the three dimensional map of the second simultaneous localization and mapping system based on the coordinates of the plurality of mappoints and the coordinates of the plurality of fake mappoints comprises:

synchronizing timestamps of the coordinates of the plurality of mappoints configured to compute the transformation matrix and the coordinates of the plurality of fake mappoints by using an external trigger or a synchronized internal clock.

8. A method for co-locating simultaneous localization and mapping systems, adaptable for co-locating a first simultaneous localization and mapping system using an image sensor and a second simultaneous localization and mapping system using a depth sensor, the method comprising following steps:

scanning a space by using the image sensor to obtain an image of the space, capturing a plurality of feature points of the image to create a plurality of mappoints in the space, and computing a first bonding box of the plurality of mappoints by using a singular value decomposition;

scanning the space by using the depth sensor to obtain shooting directions and depths of a plurality of sampling points in the space;

converting the shooting directions and the depths of the plurality of sampling points into a plurality of coordinates in the space, downsampling the plurality of sampling points to create a plurality of fake mappoints, and computing a second bounding box of the plurality of fake mappoints by using the singular value decomposition based on a position of the depth sensor in the space;

computing a transformation matrix between a three dimensional map of the first simultaneous localization and mapping system and a three dimensional map of the second simultaneous localization and mapping system based on the first bounding box, a corresponding first gravity direction, a second bounding box, and a corresponding second gravity direction;

applying the transformation matrix is configured to the three dimensional map of the first simultaneous localization and mapping system or the three dimensional map of the second simultaneous localization and mapping system to perform a colocation of the first simultaneous localization and mapping system and the second simultaneous localization and mapping system, so that the first simultaneous localization and mapping system and the second simultaneous localization and mapping system use a common coordinate system; and merging the three dimensional map of the first simultaneous localization and mapping system with the three dimensional map of the second simultaneous localization and mapping system based on the common coordinate system.

9. The method according to claim 8, wherein the steps of converting the shooting directions and the depths of the plurality of sampling points into the plurality of coordinates in the space based on the position of the depth sensor in the space comprise:

establishing a coordinate system based on the depth sensor to describe positions of the plurality of sampling points based on the shooting directions and the depths of the plurality of sampling points; and converting the positions of the plurality of sampling points into the plurality of coordinates based on the position of the depth sensor relative to the space.

10. The method according to claim 8, wherein the steps of capturing the plurality of feature points of the image to create the plurality of mappoints in the space comprise:

computing an included angle between each of the plurality of feature points and a plurality of connecting lines of adjacent feature points, and determining whether the included angle is less than a preset angle;

retaining the feature point as the mappoint if the included angle is less than the preset angle; and filtering out the feature point if the included angle is not less than the preset angle.

11. The method according to claim 10, wherein the steps of computing the included angle between each of the plurality of feature points and the plurality of connecting lines of the adjacent feature points, and determining whether the included angle is less than the preset angle further comprise:

computing a number of the plurality of connecting lines whose included angle is less than the preset angle, and multiplying the included angle of the plurality of connecting lines by a weight less than one to determine whether to retain the feature point when the number of the plurality of connecting lines exceeds a preset number.

12. The method according to claim 8, wherein after the step of downsampling the plurality of sampling points to create the plurality of fake mappoints is performed, the method further comprises:

computing a ratio of a number of the plurality of fake mappoints to a number of the plurality of mappoints, and determining whether the ratio is within a preset range;

adjusting a preset angle configured to downsample the plurality of sampling points, and re-downsampling if the ratio is not within the preset range; and using the plurality of downsampled sampling points as the plurality of fake mappoints if the ratio is within the preset range.

13. The method according to claim 8, wherein the steps of computing the transformation matrix between the three dimensional map of the first simultaneous localization and mapping system and the three dimensional map of the second simultaneous localization and mapping system based on the first bounding box, the corresponding first gravity direction, the second bounding box, and the corresponding second gravity direction comprise:

defining a first floor plane of the first bounding box based on the first gravity direction corresponding to the first bounding box, and defining a second floor plane of the second bounding box based on the second gravity direction corresponding to the second bounding box; and computing the transformation matrix configured to align the first bounding box and the second bounding box based on the first floor plane and the second floor plane.

14. The method according to claim 8, wherein the step of computing the transformation matrix between the three dimensional map of the first simultaneous localization and mapping system and the three dimensional map of the second simultaneous localization and mapping system based on the first bounding box, the corresponding first gravity direction, the second bounding box, and the corresponding second gravity direction further comprises:

estimating an advanced transformation matrix between the three dimensional map of the first simultaneous localization and mapping system and the three dimensional map of the second simultaneous localization and mapping system by using an iterative closest point algorithm based on coordinates of the plurality of mappoints and coordinates of the plurality of fake mappoints.

15. A system for co-locating simultaneous localization and mapping systems, comprising:

a first simultaneous localization and mapping system, having an image sensor;

a second simultaneous localization and mapping system, having a depth sensor; and a processing device, coupled to the first simultaneous localization and mapping system and the second simultaneous localization and mapping system, wherein the processing device comprises a hardware processor, which is configured to:

scan an anchor in a space by using the image sensor to obtain an image of the anchor and capture a plurality of feature points of the image to create a plurality of mappoints in the space;

scan the anchor by using the depth sensor to obtain shooting directions and depths of a plurality of sampling points on the anchor;

convert the shooting directions and the depths of the plurality of sampling points into a plurality of coordinates, and downsample the plurality of sampling points to create a plurality of fake mappoints based on a position of the depth sensor in the space;

compute a transformation matrix between a three dimensional map of the first simultaneous localization and mapping system and a three dimensional map of the second simultaneous localization and mapping system based on coordinates of the plurality of mappoints and coordinates of the plurality of fake mappoints;

apply the transformation matrix to the three dimensional map of the first simultaneous localization and mapping system or the three dimensional map of the second simultaneous localization and mapping system to perform a colocation of the first simultaneous localization and mapping system and the second simultaneous localization and mapping system, so that the first simultaneous localization and mapping system and the second simultaneous localization and mapping system use a common coordinate system; and merge the three dimensional map of the first simultaneous localization and mapping system with the three dimensional map of the second simultaneous localization and mapping system based on the common coordinate system.

16. A system for co-locating simultaneous localization and mapping systems, comprising:

a first simultaneous localization and mapping system, having an image sensor;

a second simultaneous localization and mapping system, having a depth sensor; and a processing device, coupled to the first simultaneous localization and mapping system and the second simultaneous localization and mapping system, wherein the processing device comprises a hardware processor, which is configured to:

scan a space by using the image sensor to obtain an image of the space, capture a plurality of feature points of the image to create a plurality of mappoints in the space, and compute a first bounding box of the plurality of mappoints by using a singular value decomposition;

scan the space by using the depth sensor to obtain shooting directions and depths of a plurality of sampling points in the space;

convert the shooting directions and the depths of the plurality of sampling points into a plurality of coordinates in the space, downsample the plurality of sampling points to create the plurality of mappoints, and compute a second bounding box of the plurality of fake mappoints by using the singular value decomposition based on a position of the depth sensor in the space;

compute a transformation matrix between a three dimensional map of the first simultaneous localization and mapping system and a three dimensional map of the second simultaneous localization and mapping system based on the first bounding box, a corresponding first gravity direction, the second bounding box, and a corresponding second gravity direction;

apply the transformation matrix to the three dimensional map of the first simultaneous localization and mapping system or the three dimensional map of the second simultaneous localization and mapping system to perform a colocation of the first simultaneous localization and mapping system and the second simultaneous localization and mapping system, so that the first simultaneous localization and mapping system and the second simultaneous localization and mapping system use a common coordinate system; and merge the three dimensional map of the first simultaneous localization and mapping system with the three dimensional map of the second simultaneous localization and mapping system based on the common coordinate system.

* * * * *